T. E. MURRAY.
METHOD OF FLANGING THE END OF A METAL TUBE.
APPLICATION FILED NOV. 4, 1916.
1,212,804.
Patented Jan. 16, 1917.
Fig. 2.
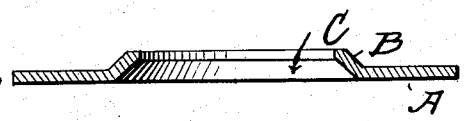
Fig. 3.
Fig. 1.
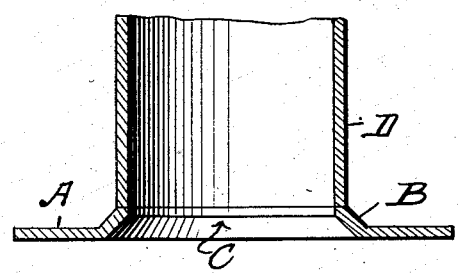
Fig. 4.
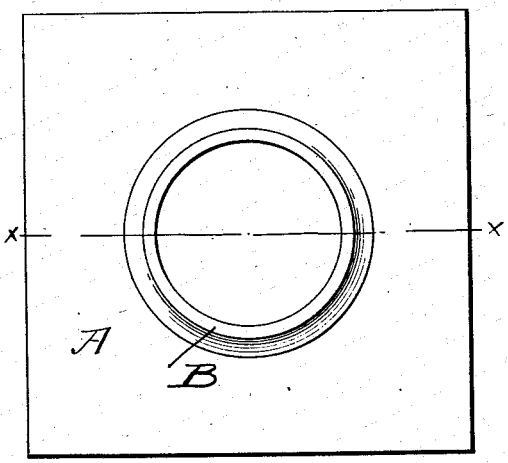
Inventor
Thomas E. Murray
By his Attorney

UNITED STATES PATENT OFFICE.

THOMAS E. MURRAY, OF NEW YORK, N. Y.

METHOD OF FLANGING THE END OF A METAL TUBE.

1,212,804.

Specification of Letters Patent.

Patented Jan. 16, 1917.

Application filed November 4, 1916. Serial No. 129,456.

*To all whom it may concern:*

Be it known that I, THOMAS E. MURRAY, a citizen of the United States, residing at New York, in the county of New York and State of New York, have invented a certain new and useful Improvement in Methods of Flanging the End of a Metal Tube, of which the following is a specification.

The invention is a method of flanging the end of a metal tube, the said method consisting in the several steps performed in the order set forth in the claim.

In the accompanying drawings—Figure 1 is the metal flange plate. Fig. 2 is a section on the line $x, x$ of Fig. 1. Fig. 3 is a similar section after the portion of the plate included within the circular rib is removed. Fig. 4 is a similar section of the plate and the tube to which said plate is welded to form the desired flange.

Similar letters of reference indicate like parts.

A is a plate of metal from which the flange is to be made. I form upon the surface of said plate a circular rib B, integral therewith and preferably by striking up said rib. The diameter across said rib between the points $a$—$b$ is to be equal to the diameter of the tube to be flanged, so that the tube may be seated upon said rib and register therewith. I then cut out by any suitable means the material of the plate A which is surrounded by said rib, thus producing the circular opening C, Fig. 3. I then place the butt end of the tube D upon said rib, as shown in Fig. 4, and cause an electric welding current to pass through the joint between said tube and said rib, thus homogeneously uniting the same.

I claim:

The method of flanging the end of a metal tube, which consists in, first, integrally forming on the surface of a metal plate a circular rib registering with the butt end of said tube, second, removing the material of said plate inclosed by said rib, and third, placing the said tube end in contact with said rib and electrically welding said tube and rib at said joint.

In testimony whereof I have affixed my signature in presence of two witnesses.

THOMAS E. MURRAY.

Witnesses:
 GERTRUDE T. PORTER,
 MAY T. MCGARRY.